Patented Mar. 1, 1927.

1,619,194

UNITED STATES PATENT OFFICE.

RANSOM W. DAVENPORT, OF DETROIT, MICHIGAN, ASSIGNOR TO CHICAGO PNEUMATIC TOOL COMPANY, OF NEW YORK, N. Y., A CORPORATION OF NEW JERSEY.

WORKING SUBSTANCE FOR HEAT ENGINES.

No Drawing. Application filed November 29, 1922, Serial No. 603,998. Renewed April 19, 1926.

My invention consists in a new and useful composition of matter of the class known as working substances for heat engines, and among its objects is the provision of improved refrigerants for carrying out the improved process of transforming heat described and claimed in my co-pending application filed June 21, 1922, Ser. No. 570,015. Suitable apparatus for use in combination with the present invention originally claimed herein, is described and claimed in a division of the present application filed April 25, 1924, Ser. No. 708,936, and the three said applications cover a series of closely related inventions.

Among the objects of the present invention is the provision of a refrigerating agent which may be used to produce low temperatures without the necessity of subjecting it to the impracticably high vacuua which must be maintained when any of the known refrigerants which are liquid at room temperatures and pressures, are used.

Another object of this invention is to provide a low-temperature refrigerating agent which may be conveniently prepared, stored, transported, handled, and condensed without the dangers hitherto incurred from bursting and leaking of containers of the high-pressure gases hitherto necessary to attain low temperature refrigeration.

A further object of my invention is to provide a working substance having certain new and useful thermodynamic properties not possessed by any hitherto known, such as, for example, the property of producing different refrigerating temperatures in different parts of a single evaporator or expansion chamber, and others which will be explained hereafter.

Besides many simple substances such as air, water, anhydrous ammonia, etc., many more complex substances have been suggested as working substances. For example, the so-called Pictet's fluid, a compound of sulphur and carbon dioxides, have been suggested, and are generally alleged to possess unique characteristics in the way of vapor tensions. While the existence of these unique properties is generally known in the art, the causes of them are quite generally misunderstood. I find that such complex compounds derive their unique vapor-pressure properties from the fact that many substances which are completely miscible at one temperature, partly or completely separate at other temperatures, thus altering the vapor tension curve quite suddenly or abruptly between certain temperature limits. "Pictet's fluid" above mentioned serves as a type of such working substances. As will be set forth hereinafter, my improved composition differs fundamentally from all compounds of the solution type, as my ingredients are substantially insoluble at all temperatures and pressures under which I employ it.

Air is sometimes used as a working substance on the reversed Joule cycle. It is never used on the Carnot cycle, because at all commercial refrigerating temperatures, it is a substantially perfect gas. It could, of course, be used on the reversed Carnot cycle like water or carbon di-oxide; but its critical temperature and boiling point are so low as to make such use undesirable. As commonly used, air has the disadvantage that its specific heat is very low; and since there is no change of state, the available refrigerating effect is small in proportion to the volume which must be handled, thus requiring the apparatus to be very large and expensive.

Since air is a practically perfect gas at all ordinary temperatures and pressures, and therefore is very different indeed from the working fluids used in vapor-compression and vapor-expansion heat engines, it has hitherto been universally regarded as an unmitigated evil when it leaks into and contaminates such working fluids.

When any ordinary liquid-vapor working substance is contaminated with a non-condensible gas such as air, it is commonly known that the gas forms no mixture or emulsion with the liquid but merely collects in the condenser and, in the case of refrigerating systems, simply imposes an increased pressure on the compressor, thus wasting power without improving refrigeration. Furthermore, the air which has collected in the condenser was heretofore thought to be "saturated" with the vapor of whatever liquid was used as the working substance. Due to this universal belief, no attempt has ever been made to use this "saturated" air for refrigerating. Of course it could be used for other purposes as, for example, a "blast" or mere mechanical agitator entirely independent of the essential refrigerating process. Such use is disclosed in the patent to Wanner, No. 500,017, June 20, 1893, whose object is to raise the temperatures and prevent the freezing of his liquid working substance by blowing the frozen particles through the expansion coils with "a blast of air from behind".

Conversely and oppositely, air which has not yet been "saturated with vapor" or, in other words, "fresh" air, has been commonly used for centuries to increase the evaporation of liquids. For it has been universally believed that only fresh or "dry" air had a certain property called "holding" or "absorbing" by which it was imagined that moisture or vapor was picked up. Use of air under this imaginary principle is exemplified in the patent to Garrison, No 158,269. Dec. 29, 1874.

While it may be convenient to avoid circumlocution by using the term "saturated air", it is well known to scientists that it is space which actually becomes "saturated" or "filled with saturated vapor" and so long as the components of a mixture of a vapor and a gas are of relatively low density, each component behaves, in a state of equilibrium, very nearly as if it were present alone. The gas has little or no appreciable action upon the vapor except to impede the freedom of movement of the latter through the space occupied by the mixture.

By applying the knowledge that air cannot be saturated with vapor or moisture, and therefore cannot ever be considered as either dry or wet, I am enabled to produce a new composition of matter differing fundamentally and basically from any hitherto known or used as a working substance in a closed-cycle heat engine.

My new composition of matter consists in a physical mixture of substances so chosen that at all temperatures encountered by it in its working cycle, three phases co-exist (viz liquid, vapor, and gas), in the presence of a fourth novel phase, which I call vapor-gas.

The word "phase" is here used to identify a certain state of matter. While it was formerly thought that matter exists in but three phases (solid, liquid, and gaseous), it is now recognized that other phases can and do exist. For example, in the transition state between solid and liquid, matter is known to exist in a phase differing from both solid and liquid, yet resembling both. No comprehensive term has yet come into common usage to identify such transition states. The phase between solid and liquid is variously called "colloid", "viscous solid", etc., but I am not aware that the phase between liquid and gas which is called "saturated vapor" has ever been recognized as definitely different from the more stable phase known as "gas". Certainly in the refrigerating and allied arts, no difference between vapor and gas is recognized, and the terms are used synonymously by experts in these arts. I have found that between liquid on the one hand, and perfect gas on the other hand, several transition phases can and do co-exist. The term vapor-gas used above identifies these novel phases, and is hereinafter used to designate my new composition of matter.

As a natural result of the general failure to differentiate vapor and gas above referred to, it is not generally known that when a certain thermodynamic operation—such as expansion—is performed upon vapor in contact with its own liquid, and upon a gas such as air, vastly different thermodynamic results are obtained. Thus, while the free expansion of a gas results in little or no temperature change, so-called expansion of a vapor in contact with its own liquid is actually impossible without thermal change, and this thermal change or absorption of heat by the vapor results in the change of state from vapor to gas referred to above.

Bearing in mind this difference, it is readily seen that when and if the mixture of gas and vapor is expanded in the presence of the vapor's own liquid (thus forming a temporary or unstable emulsion) heat must be supplied or the liquid will grow colder. Further, when it is realized that the mixture of gas and vapor occupies no more room or space than either gas or vapor alone occupy, it is evident that the particles of each component must remain integral. But while either air or vapor, alone and unmixed, can and does expand nearly instantaneously, vapor-gas (mixed gas and vapor in contact with the vapor's liquid) on the contrary cannot and does not expand nearly so quickly, since the air particles are entangled in the vapor. As a consequence of this, many novel and useful thermodynamic properties inhere in my working substance.

For example, with vapor-gas it is practicable to maintain a single boiler or refrigerating unit at a variety of temperatures, for obviously since time is required to reach equilibrium, the zone closest to the point at which expansion begins will be much the coldest. Another novel and useful thermodynamic property is apparent during the resisted expansion of vapor-gas since the rapid condensation of liquid which may result during such expansion of a pure vapor is, with my invention, impossible. Another remarkable new and useful property of my working substance is its improved thermodynamic reversibility. For, as is well known, any abrupt and considerable thermodynamic transformation is highly irreversible and therefore highly inefficient, and hence the more gradual transformations which are the peculiar property of vapor-gas result in greatly improved reversibility. Doubtless many other valuable properties not yet apparent in so novel a substance, will later be discovered to be essentially inherent in my invention.

It will now be plain to anyone skilled in the art that because my new composition of matter is neither a gas nor a liquid-vapor working substance, in order to develop and use its many novel advantages one must necessarily depart from both the old classes of compression heat engines, viz the liquid-vapor machines and the compressed air machines. My invention is inoperative in both the old classes of machines.

While any composition of matter having the thermodynamic properties of a two-component, multi-phase system is the substantial equivalent of any other composition when used for the objects sought and attained by the present invention, there may be in certain specific liquid and gas components other properties relating to physiological effects, chemical stability, vapor pressures, etc., which should guide the choice of materials in adapting the principles of my invention to particular cases. For example, the liquid component may be either a simple liquid, as water, or a complex one like aqua ammonia of Pictet's fluid. The gas component may be any simple gas such as nitrogen, or a mixture like air, so long as it is substantially inert and insoluble in the liquid component at all working temperatures and pressures. Similarly, the proportions of the components are wholly immaterial to the spirit of my invention, for its is obvious that as the proportion of the gaseous component is raised or lowered, the thermodynamic properties of my working substance simply approach toward and recede from but never reach, the thermodynamic properties of the common gas working substances and the common liquid-vapor working substances, respectively. The proportions, like the ingredients, of my new composition should be chosen to fit the particular case.

I have found that pure carbon tetrachloride (CCl$_4$) and pure air in such proportions that the partial pressure of the air comprises about sixty percent of the total pressure, is a composition quite well suited to the particular case of the small household refrigerating machine, since such a composition is perfectly safe and harmless in addition to possessing those properties peculiar to the spirit of my invention.

But for reasons now apparent my invention is not limited to the particular liquid set forth above. As clearly stated in the draft of this specification as originally filed, it is adapted to a great variety of volatile liquids, to the known refrigerants such as anhydrous ammonia, to simple liquids such as alcohol and the chlorinated hydrocarbons, and to complex liquid such as mixtures of the ethyl and methyl chlorides, also alcohol mixtures containing a chlorinated hydrocarbon. In all cases a suitable gas substantially insoluble in and inert to the volatile liquid is added to provide the fluid working substance. The gas chosen is such as to function as a perfect gas and to be incondensible at the ordinary temperatures and pressures obtaining in systems of the type described. In most instances the gas can be air. It is thus apparent that my invention permits the selection of a refrigerant mixture which is safe and harmless and which is capable of use in accordance with the processes and apparatus specifically described and claimed in the two separate applications hereinbefore mentioned without the sacrifice of any desirable heat transforming effects.

I claim as my invention:

1. The use as a refrigerating fluid of carbon tetrachloride and a mixture of the vapor of the latter and of a gas substantially inert toward and insoluble in the liquid carbon tetrachloride at common atmospheric temperatures and pressures.

2. The use of a fluid composition for producing refrigerating effects in a closed cycle system comprising a liquid having a vapor which has a tension of more than 725 millimeters of mercury at 100° C. and a mixture with said vapor of a gas substantially inert toward and insoluble in said vapor and incondensible at the temperature and pressures obtaining in said system.

3. The use of a composition of matter comprising a physical mixture of carbon tetrachloride and air for producing refrigerating effects.

4. The use in a compression expansion refrigerating system of a fluid composition comprising a complex liquid having a vapor having a total tension of more than 725 millimeters of mercury at 100° C., and a mixture with said vapor of a gas substantially inert toward and insoluble in said vapor and said liquid and incondensible at the temperatures and pressures obtaining in the system.

5. The use as a working substance for refrigerating systems of a fluid composition comprising a liquid having a vapor which has a tension of more than 725 millimeters of mercury at 100° C., and a mixture of air with the vapor of said liquid.

6. The use as a working substance for refrigerating systems of a fluid composition comprising a complex liquid having a vapor which has a tension of more than 725 millimeters of mercury at 100° C., and a mixture of air with the vapor of said liquid.

7. The use as a working substance for refrigerating systems of a fluid composition comprising a volatile liquid and a gas substantially inert to and insoluble in said liquid and incondensible at the temperatures and pressures obtaining in such systems.

8. The use as a working substance for refrigerating systems of a fluid composition comprising a chlorinated hydrocarbon and a gas, said gas being substantially inert to and insoluble in said chlorinated hydrocarbon in both its liquid and its vapor states and having the properties of perfect gas at the temperatures and pressures obtaining in such systems.

9. The use as a working substance for refrigerating systems of a fluid composition comprising a chlorinated hydrocarbon and air.

10. The use as a refrigerant fluid of a volatile liquid and a mixture of the vapor of the latter and of a gas, said gas being substantially inert to and insoluble in the liquid and having the properties of a perfect gas at the temperatures and pressures obtaining in refrigerating systems.

11. The use as a working substance for compression-expansion refrigerating systems of a fluid mixture comprising a liquid containing a volatile component and a gas substantially inert to and insoluble in said liquid and its components in both their liquid and vapor states and incondensible at the temperatures and pressures obtaining in such systems.

12. The use as a working substance for refrigerating systems of a fluid mixture comprising a complex liquid containing a chlorinated hydrocarbon and a gas, said gas being substantially inert to and insoluble in said liquid and having the properties of a perfect gas at the temperatures and pressures obtaining in such systems.

13. The use as a working substance for producing refrigerating effects of a fluid mixture comprising a complex liquid containing a volatile component and air.

14. The use as a working substance for producing refrigerating effects of a fluid mixture comprising a complex liquid containing a chlorinated hydrocarbon and air.

15. The use as a refrigerant fluid for closed cycle refrigerating systems of a physical mixture of a liquid having a boiling point under 79° C. and of a gas, said gas being substantially inert to and insoluble in said liquid and incondensible at common atmospheric temperature and pressures.

16. The use as a refrigerant fluid for closed cycle refrigerating systems of a physical mixture of a liquid having a boiling point under 79° C. and of air.

RANSOM W. DAVENPORT.